(12) United States Patent
Coenegracht

(10) Patent No.: US 10,481,341 B2
(45) Date of Patent: Nov. 19, 2019

(54) FIBER OPTIC ADAPTER ASSEMBLY

(71) Applicant: TYCO ELECTRONICS RAYCHEM BVBA, Kessel-Lo (BE)

(72) Inventor: Philippe Coenegracht, Hasselt (BE)

(73) Assignee: COMMSCOPE CONNECTIVITY BELGIUM BVBA, Kessel-Lo (BE)

(*) Notice: Subject to any disclaimer, the term of this patent is extended or adjusted under 35 U.S.C. 154(b) by 0 days.

(21) Appl. No.: 15/503,203

(22) PCT Filed: Aug. 14, 2015

(86) PCT No.: PCT/EP2015/068759
§ 371 (c)(1),
(2) Date: Feb. 10, 2017

(87) PCT Pub. No.: WO2016/024014
PCT Pub. Date: Feb. 18, 2016

(65) Prior Publication Data
US 2017/0235060 A1 Aug. 17, 2017

Related U.S. Application Data

(60) Provisional application No. 62/037,305, filed on Aug. 14, 2014.

(51) Int. Cl.
G02B 6/36 (2006.01)
G02B 6/38 (2006.01)

(52) U.S. Cl.
CPC ......... *G02B 6/3825* (2013.01); *G02B 6/3821* (2013.01); *G02B 6/3831* (2013.01); *G02B 6/3877* (2013.01); *G02B 6/3881* (2013.01); *G02B 6/3887* (2013.01); *G02B 6/3875* (2013.01); *G02B 6/3897* (2013.01)

(58) Field of Classification Search
None
See application file for complete search history.

(56) References Cited

U.S. PATENT DOCUMENTS

| 4,518,220 A | 5/1985 | Swanson |
| 4,953,941 A | 9/1990 | Takahashi |
| 4,964,688 A | 10/1990 | Caldwell et al. |

(Continued)

FOREIGN PATENT DOCUMENTS

| CN | 102928922 A | 2/2013 |
| CN | 103502860 A | 1/2014 |

(Continued)

OTHER PUBLICATIONS

Tsuchiya, Haruhiko, Machine Translation of JP 52-072240 A, Dec. 12, 1975. (Year: 1975).*

(Continued)

*Primary Examiner* — Michelle R Connelly
(74) *Attorney, Agent, or Firm* — Merchant & Gould P.C.

(57) ABSTRACT

A fiber optic adapter assembly is provided with a floating adapter module. The adapter assembly includes a housing, an adapter module, and a single biasing member disposed in the housing and concentrically aligned with the adapter module. The single biasing member can bias the adapter module in a direction toward an end of the housing and be compressible in the opposite direction toward the other end of the housing.

15 Claims, 9 Drawing Sheets

(56) References Cited

U.S. PATENT DOCUMENTS

| | | |
|---|---|---|
| 5,134,677 A | 7/1992 | Leung et al. |
| 5,581,644 A | 12/1996 | Saito et al. |
| 6,422,764 B1 | 7/2002 | Marrs et al. |
| 6,579,014 B2 | 6/2003 | Melton et al. |
| 6,899,467 B2 | 5/2005 | McDonald et al. |
| 6,962,445 B2 | 11/2005 | Zimmel et al. |
| 7,044,650 B1 * | 5/2006 | Tran ................. G02B 6/3874 385/54 |
| 7,113,679 B2 | 9/2006 | Melton et al. |
| 7,114,855 B2 | 10/2006 | Wittrisch |
| 7,438,479 B2 | 10/2008 | Mitamura |
| 7,572,065 B2 | 8/2009 | Lu et al. |
| 7,654,747 B2 | 2/2010 | Theuerkorn et al. |
| 7,686,519 B2 | 3/2010 | Lu |
| 7,744,288 B2 | 6/2010 | Lu et al. |
| 7,785,016 B2 | 8/2010 | Luther et al. |
| 7,985,027 B2 | 7/2011 | Lewallen et al. |
| 8,376,628 B2 * | 2/2013 | Koreeda ............. G02B 6/3879 385/60 |
| 8,515,233 B2 * | 8/2013 | Dominique .......... G02B 6/00 385/134 |
| 8,676,022 B2 | 3/2014 | Jones |
| 2001/0007641 A1 * | 7/2001 | Jovanovich ........ G01N 30/6039 422/538 |
| 2001/0012428 A1 * | 8/2001 | Nakajima ........... G02B 6/3831 385/78 |
| 2006/0193562 A1 | 8/2006 | Theuerkorn |
| 2008/0310796 A1 | 12/2008 | Lu |
| 2009/0238520 A1 * | 9/2009 | Wouters ............... G02B 6/389 385/59 |
| 2013/0022317 A1 | 1/2013 | Norris et al. |
| 2014/0064671 A1 | 3/2014 | Barnette, Jr. et al. |
| 2014/0241670 A1 | 8/2014 | Barnette, Jr. et al. |
| 2017/0139158 A1 | 5/2017 | Coenegracht |
| 2017/0235060 A1 | 8/2017 | Coenegracht |
| 2017/0261696 A1 | 9/2017 | Compton et al. |
| 2017/0261698 A1 | 9/2017 | Compton et al. |
| 2017/0261699 A1 | 9/2017 | Compton et al. |
| 2018/0246282 A1 | 8/2018 | Dong et al. |
| 2018/0252875 A1 | 9/2018 | Pimpinella et al. |

FOREIGN PATENT DOCUMENTS

| | | | |
|---|---|---|---|
| CN | 205038371 U | 2/2016 | |
| GB | 2 201 009 A | 8/1988 | |
| JP | 52072240 A * | 6/1977 | .......... G02B 6/3825 |
| JP | 57029023 A * | 2/1982 | .............. G02B 6/32 |
| JP | S57-29023 A | 2/1982 | |
| JP | 60006909 A * | 1/1985 | ............. G02B 6/381 |
| JP | S60-6909 A | 1/1985 | |
| JP | 2000-28859 A | 1/2000 | |
| JP | 2000028859 A * | 1/2000 | |
| JP | 2000028859 A * | 1/2000 | |
| JP | 2013-160880 A | 8/2013 | |
| WO | 2014/123940 A1 | 8/2014 | |
| WO | 2014/167447 A1 | 10/2014 | |
| WO | 2014/197894 A1 | 12/2014 | |
| WO | 2015/197588 A1 | 12/2015 | |

OTHER PUBLICATIONS

International Search Report and Written Opinion of the International Searching Authority for corresponding International Patent Application No. PCT/EP2015/068759 dated Oct. 29, 2015, 10 pgs.
International Search Report and Written Opinion of the International Searching Authority for corresponding International Patent Application No. PCT/CN2016/086847 dated Sep. 29, 2016, 11 pages.
Communication in European Patent Application No. 15 749 838.7, dated Aug. 14, 2018, 6 pages.

\* cited by examiner

FIBER OPTIC ADAPTER ASSEMBLY

CROSS-REFERENCE TO RELATED APPLICATION

This application is a National Stage Application of PCT/EP2015/068759, filed on Aug. 14, 2015, which claims benefit of U.S. Patent Application Ser. No. 62/037,305 filed on Aug. 14, 2014, and which applications are incorporated herein by reference. To the extent appropriate, a claim of priority is made to each of the above disclosed applications.

BACKGROUND

Fiber optic cables are widely used to transmit light signals for high speed data transmission. Typically, fiber optic cables may be connected in the field through fiber optic cable connection systems, which do not require a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports for receiving the fiber optic connectors desired to be interconnected. The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement for mechanically retaining the fiber optic connectors within the adapter.

In certain examples, the adapter may include a housing and an adapter sleeve disposed within the housing and biased toward an end of the housing, through which a fiber optic connector of a fiber optic cable is inserted. The adapter typically includes a plurality of springs (e.g., a pair of springs) to bias the adapter sleeve toward the end of the housing. Examples of the adapter are disclosed in U.S. Pat. Nos. 6,579,014 and 7,044,650. Improper spring seating may result in poor or uneven biasing of the adapter sleeve.

SUMMARY

In general terms, this disclosure is directed to an adapter assembly for fiber optic cable. In one possible configuration and by non-limiting example, the adapter assembly includes an adapter module floatingly disposed within a housing and biased by a single biasing member. Various aspects are described in this disclosure, which include, but are not limited to, the following aspects.

One aspect is a fiber optic adapter assembly including a housing, an adapter module, and a single biasing member. The housing may define an internal cavity being open through a first opening at a first exterior end and through a second opening at a first interior end opposite to the first exterior end. The adapter module may be disposed in the internal cavity of the housing and configured to align ferrules of fiber optic cable connectors inserted into the adapter module in opposite directions. The single biasing member may be disposed in the internal cavity of the housing and concentrically aligned with the adapter module. The single biasing member may be configured to bias the adapter module in a direction toward the first exterior end and be compressible in a direction toward the first interior end. In certain examples, the single biasing member may be a compression coil spring.

In certain examples, the adapter module may include an adapter body and a flange extending radially outwardly from the adapter body. The flange may be configured to engage an end of the single biasing member.

In certain examples, the adapter module may be configured to be longitudinally slidable through the second opening of the housing. The housing may include a first guide element, and the adapter module may include a second guide element correspondingly engaging the first guide element of the housing and configured to guide the adapter module to longitudinally move through the second opening of the housing. The first guide element may be a groove defined adjacent the second opening of the housing at the first interior end, and the second guide element may be a projection formed along the longitudinal axis on the adapter module.

In certain examples, the adapter module may include a ferrule holder and an adapter body. The ferrule holder may have a barrel portion extending along the longitudinal axis and configured to receive ferrules of a first fiber optic connector and a second fiber optic connector from opposite directions and align optical fibers of the first and second fiber optic connectors therein. The adapter body may be configured to at least partially surround the ferrule holder and include a flange extending radially outwardly from the adapter body. The flange may be configured to engage an end of the single biasing member. The adapter body may be configured to be longitudinally slidable through the second opening of the housing. The single biasing member may be disposed in the internal cavity of the housing to at least partially surround the adapter body.

In certain examples, the housing may include a first guide element, and the adapter body may include a second guide element correspondingly engaging the first guide element of the housing and configured to guide the adapter module to longitudinally move through the second opening of the housing. The first guide element may be a groove defined adjacent the second opening of the housing at the first interior end. The second guide element may be a projection formed along the longitudinal axis on the adapter module.

In certain examples, the ferrule holder may include a pair of latching arms configured to interlock with the second fiber optic connector when the second fiber optic connector is received through the second opening of the housing.

In certain examples, the adapter module may further include a ferrule alignment sleeve disposed within the barrel portion of the ferrule holder and configured to receive the ferrules of the first and second fiber optic connectors from opposite directions.

In certain examples, the housing may include a first housing component and a second housing component. The first housing component may be configured to at least partially receive the biasing member and the adapter module. The first housing component may include a plurality of retaining slots. The second housing component may be secured to the first housing component and include a plurality of corresponding retaining clips configured to engage the plurality of retaining slots of the first housing component. The second housing component may include an axial stopper configured to limit an axial movement of the adapter module within the first housing component in a direction toward the first exterior end of the first housing component.

In certain examples, the housing may include a first axial stopper configured to limit an axial movement of the adapter module within the housing in the direction toward the first exterior end of the housing. The housing may include a second axial stopper configured to limit an axial movement of the adapter module within the housing in a direction toward the first interior end of the housing.

Another aspect is a fiber optic adapter assembly (106) including an first housing component, an adapter module, a single biasing member, and a second housing component. The first housing component may define a first housing opening, an internal cavity, and a second housing opening. The internal cavity may be open at a first exterior end through the first housing opening and at a first interior end through the second housing opening. The first exterior end is opposite to the first interior end along a longitudinal axis. The first housing component may include a plurality of retaining slots. The adapter module may be disposed in the internal cavity of the first housing component and define a ferrule alignment passageway opening through a first module end and a second module end opposite to the first module end along the longitudinal axis. The single biasing member may be disposed in the internal cavity of the first housing component and concentrically aligned with the adapter module. The single biasing member may be configured to bias the adapter module in a direction toward the first exterior end and be compressible in a direction toward the first interior end. The second housing component may be secured to the first housing component and include a plurality of corresponding retaining clips configured to engage the plurality of retaining slots of the first housing component.

In certain examples, the first housing component may include a shoulder formed at the first interior end and configured to support a first end of the single biasing member. The adapter module may include a ferrule holder and an adapter body. The ferrule holder may have a barrel portion extending along the longitudinal axis to define the ferrule alignment passageway. The ferrule holder may be configured to receive ferrules of a first fiber optic connector and a second fiber optic connector from opposite directions and align optical fibers of the first and second fiber optic connectors therein. The adapter body may include an enclosing side wall configured to at least partially surround the ferrule holder. The adapter body may include a flange extending radially outwardly from the adapter body. The flange may be configured to engage a second end of the single biasing member. The single biasing member may be arranged at least partially surround the adapter body. The adapter body may be configured to move through the second housing opening of the first housing component along the longitudinal axis.

DETAILED DESCRIPTION

Figure 1:
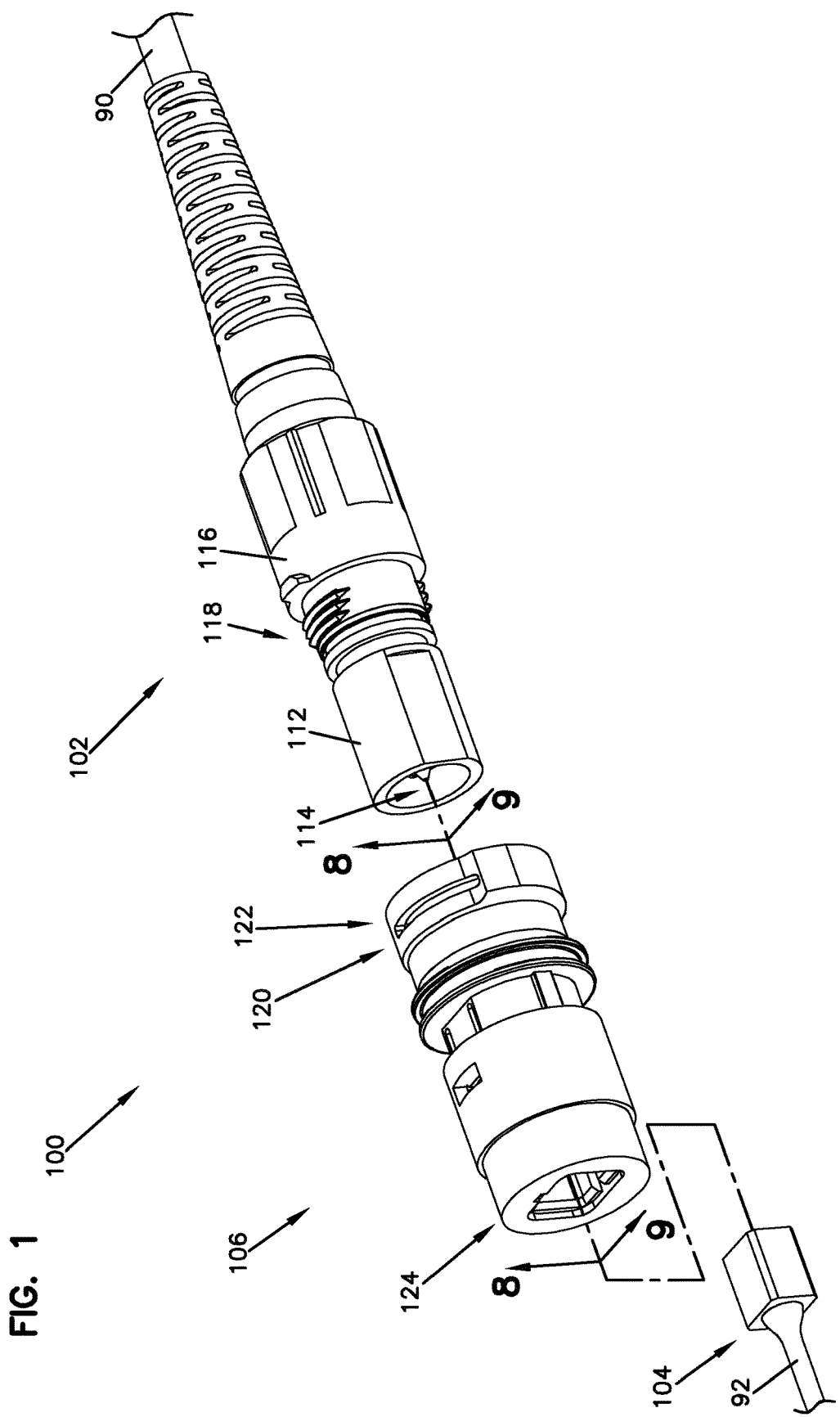
FIG. 1 is a perspective view of a fiber optic connection system in accordance with the principles of the present teachings.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a perspective view of a fiber optic connection system 100 in accordance with the principles of the present teachings. The fiber optic connection system 100 may include a first fiber optic connector 102, a second fiber optic connector 104, and an adapter assembly 106.

The first fiber optic connector 102 may be a hardened or ruggedized fiber optic connector that terminates a fiber optic cable 90. In some embodiments, the fiber optic connector 102 can include a connector housing 112, a ferrule assembly 114, and a coupling nut 116. The connector housing 112 is configured to at least partially receive and support the ferrule assembly 114 therein. The ferrule assembly 114 is configured to support an end portion of an optical fiber of the fiber optic cable 90 and has a distal end face at which a polished end of the optical fiber is located. The distal end face of the ferrule assembly 114 is arranged at an open end of the connector housing 112 and configured to abut or be in close proximity to a distal end face of the second fiber optic connector 104 within the adapter assembly 106. The ferrule assembly 114 is held by the connector housing 112 and configured to align the end portion of the optical fiber of the fiber optic cable 90 to a ferrule holder 184 (FIGS. 5 and 6) within the adapter assembly 106 so that the end portion of the optical fiber of the fiber optic cable 90 abut or is in close proximity to an end portion of an optical fiber of a second fiber optic cable 92 that is inserted into the adapter assembly 106. The coupling nut 116 is coupled onto the connector housing 112 and provides a gripping surface for users. The coupling nut 116 can be at least partially rotatably mounted onto the connector housing 112. The coupling nut 116 can further include a first coupling mechanism 118 configured to selectively engage a second coupling mechanism 120 of the adapter assembly 106 to provide keyed positioning of the fiber optic connector 102 relative to the adapter assembly 106 and to serve to align the ferrule assembly 114 with the ferrule holder 184 (FIGS. 5 and 6) within the adapter assembly 106. An example of the first and second coupling mechanisms 118 and 120 are illustrated in U.S. Application No. 62/016,075, the disclosure of which is hereby incorporated by reference.

The second fiber optic connector 104 is configured to terminate a second fiber optic cable 92. In some embodiments, the second fiber optic connector 104 can include a ferrule assembly (not shown) that is similar to the ferrule assembly 114 of the first fiber optic connector 102 to support an end portion of an optical fiber of the fiber optic cable 92. In some embodiments, the second fiber optic connector 104 can be a Subscription Channel (SC) connector. The second fiber optic connector 104 is configured to be inserted into a second adapter end 124 of the adapter assembly 106 so that the optical fiber of the second fiber optic cable 92 is abutted to, or in close proximity to, the end portion of the optical fiber of the cable 90 within the adapter assembly 106.

Figure 5:
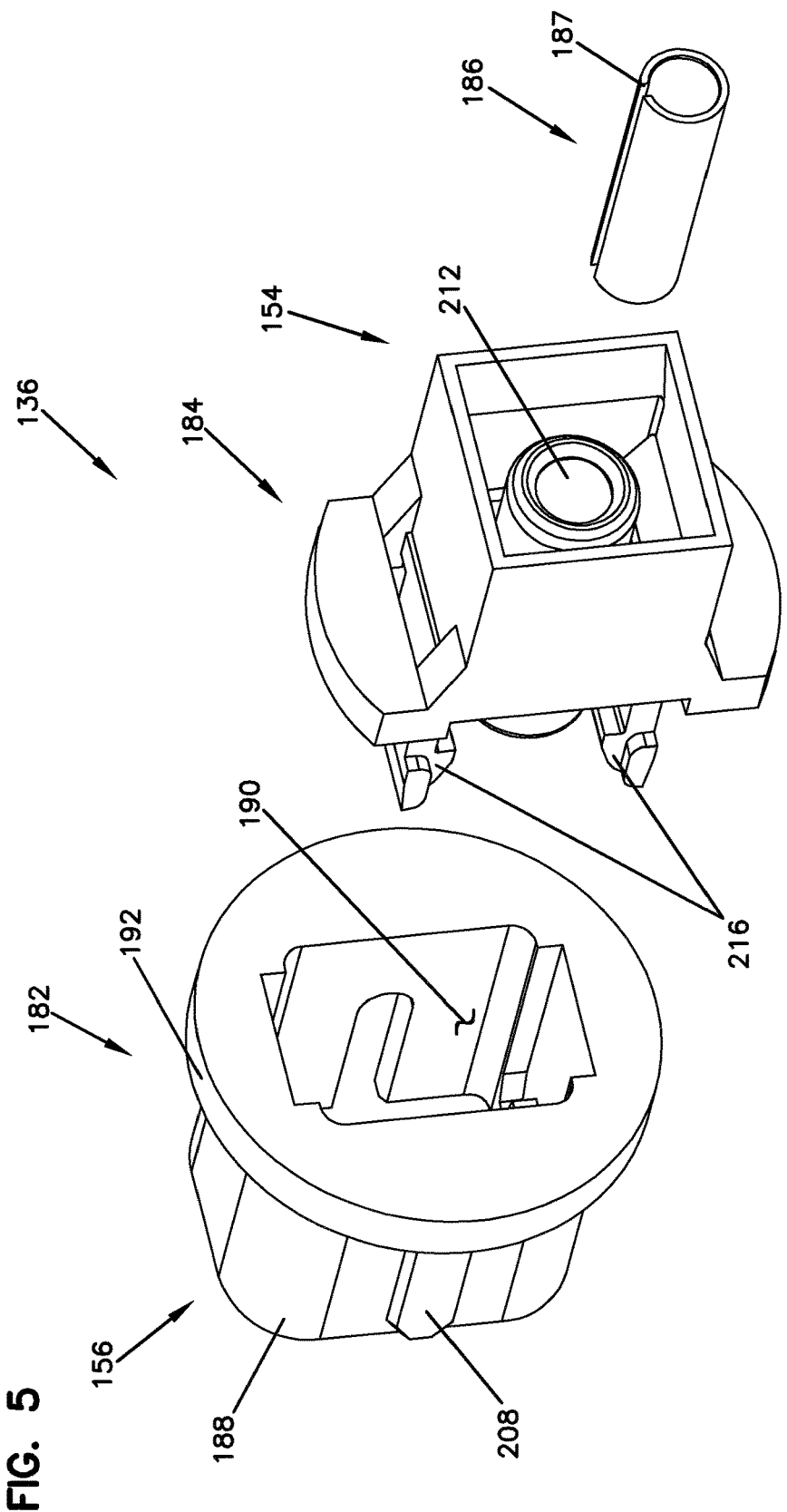
FIG. 5 is a perspective view of an example adapter module.
Figure 6:
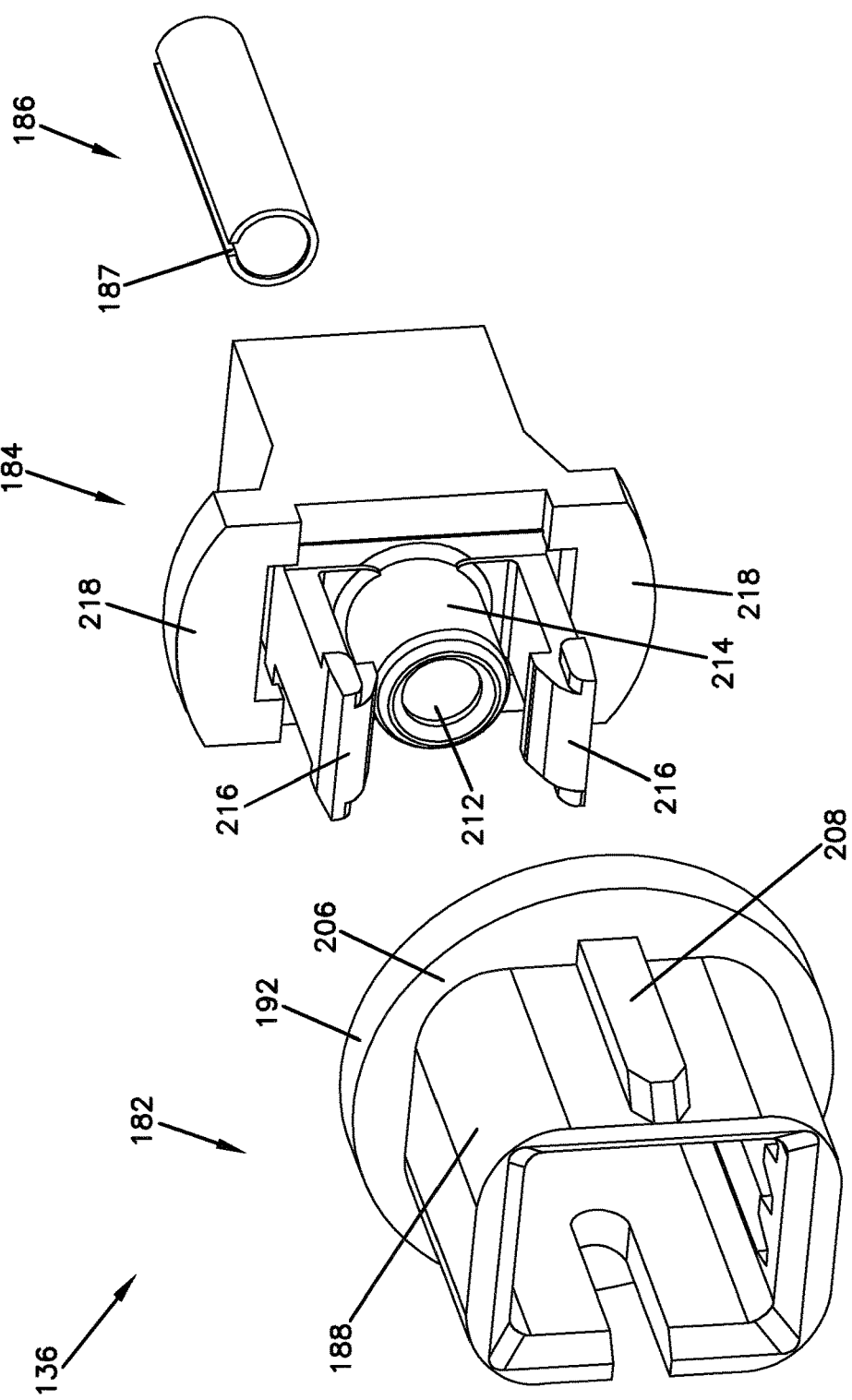
FIG. 6 is an opposite perspective view of the adapter module of FIG. 5.

The adapter assembly 106 is configured to receive the first fiber optic connector 102 at a first adapter end 122 and the second fiber optic connector 104 at a second adapter end 124. The adapter assembly 106 can be configured to selectively engage the first fiber optic connector 102 through the first and second coupling mechanisms 118 and 120. In some embodiments, the adapter assembly 106 can also be configured to selectively engage the second fiber optic connector 104 (e.g., via latching arms 216 as shown in FIGS. 5 and 6). An example of the adapter assembly 106 is illustrated and described in more detail with reference to FIG. 2.

Figure 2:
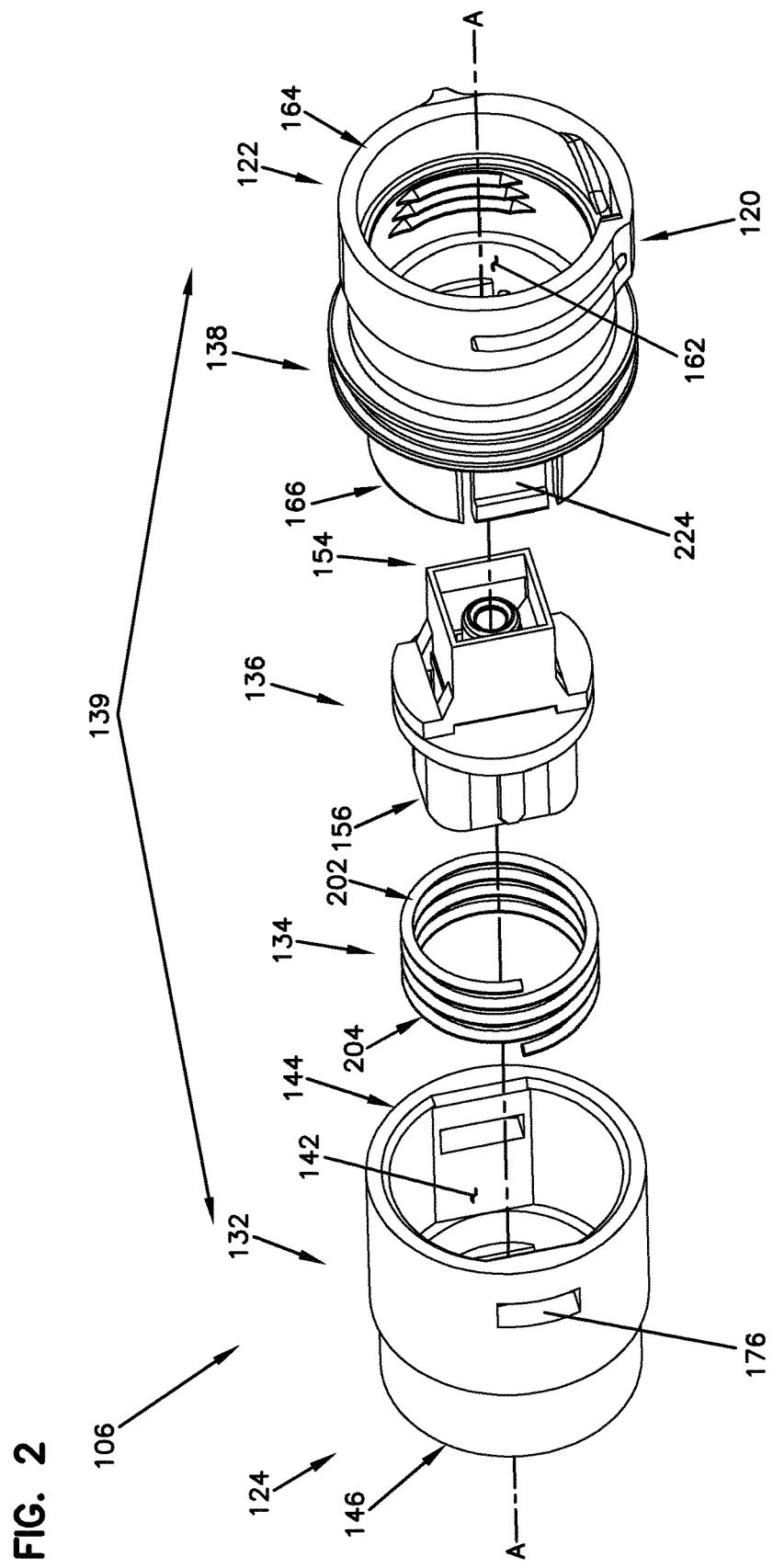
FIG. 2 is an exploded view of the adapter assembly of FIG. 1.

FIG. 2 is an exploded view of the adapter assembly 106 of FIG. 1. In some embodiments, the adapter assembly 106 can include an adapter housing 139 including a first housing component 132 and a second housing component 138. The adapter assembly 106 further includes a single biasing member 134 and an adapter module 136.

The adapter assembly 106 in accordance with an example of the present teachings includes the single biasing member 134, such as a coil spring, which is concentrically aligned with the adapter module 136 within the first housing component 132. The single biasing member 134 biases the adapter module 136 in a direction toward the second housing component 138 (e.g., in an outward/exterior direction $D_{EXT}$), and can compress to allow the adapter module 136 to move in the opposite direction (e.g., in an inward/interior direction $D_{INT}$) within the first housing component 132 when, for example, the first fiber optic connector 102 is inserted into the adapter assembly 106. The single biasing member 134 can absorb tolerances during assembling of the adapter assembly 106 and provide even biasing of the adapter module 136 within the first housing component 132. In contrast, a plurality of springs used in the conventional adapter assemblies makes it difficult to accurately arrange all of the springs together between the adapter module and the first housing component during assembly, thereby causing misalignment of the springs and uneven biasing of the adapter module within the first housing component. Further, the single biasing member 134 can surround a portion of the adapter module 136 within the first housing component 132 to reduce the size of the adapter assembly 106.

Figure 3:
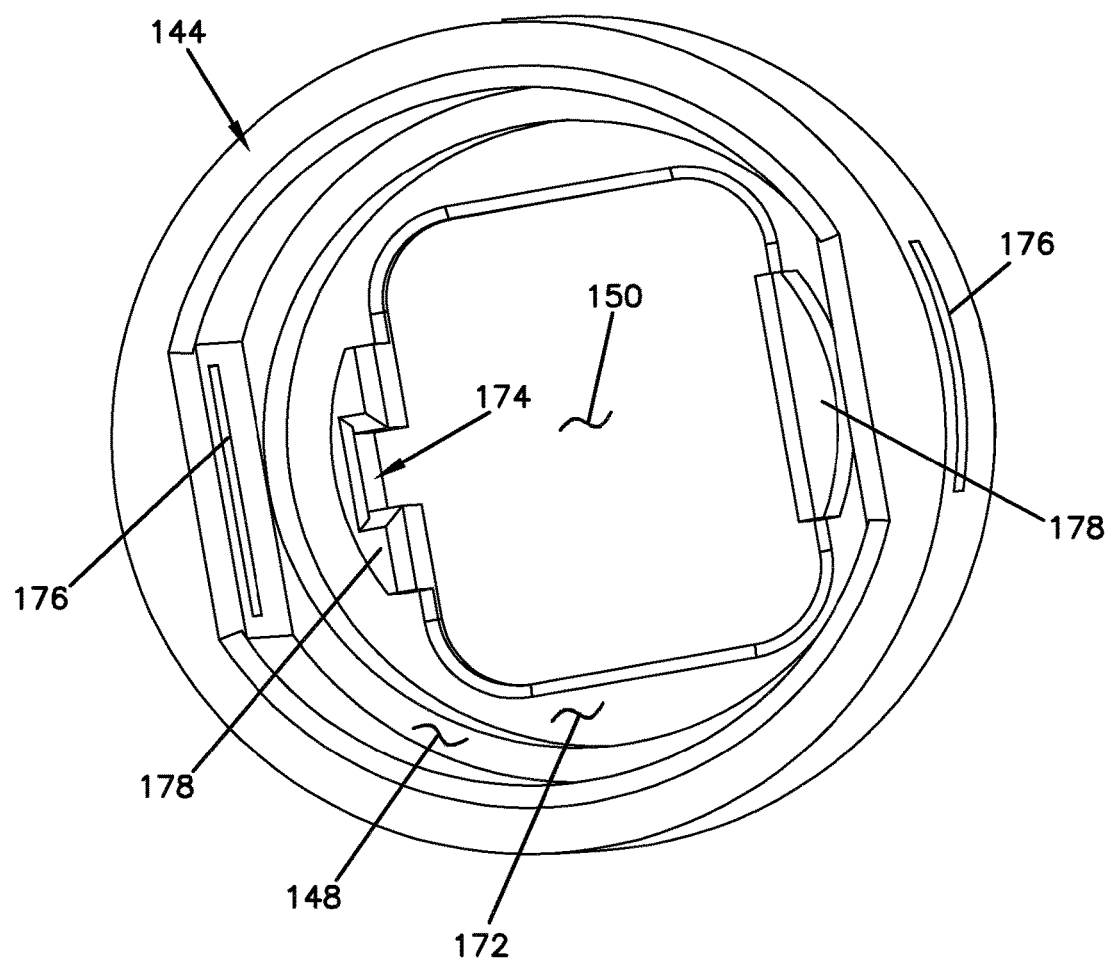
FIG. 3 is a perspective view of an example first housing component.
Figure 4:
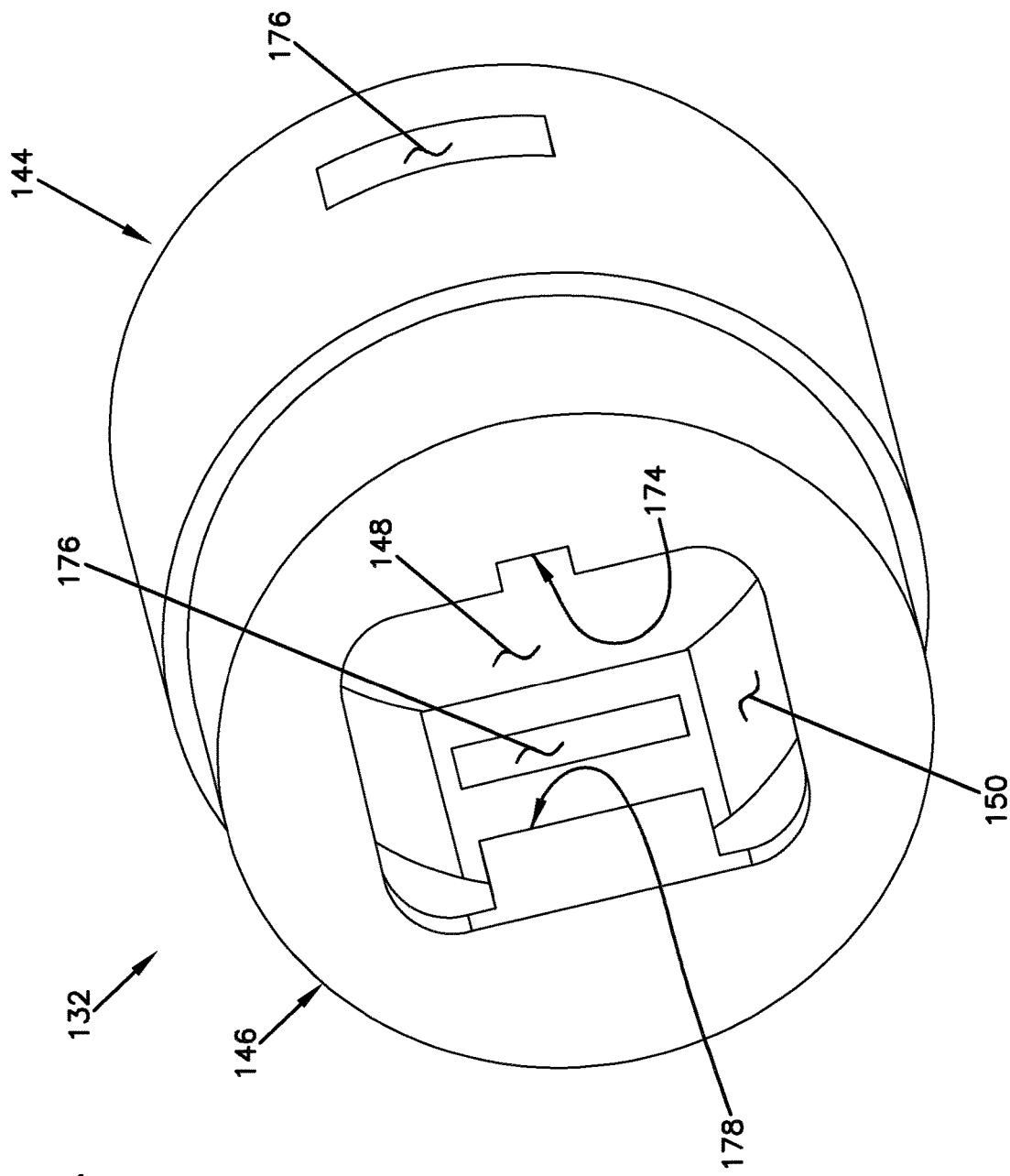
FIG. 4 is an opposite perspective view of the first housing component of FIG. 3.
Figure 8:
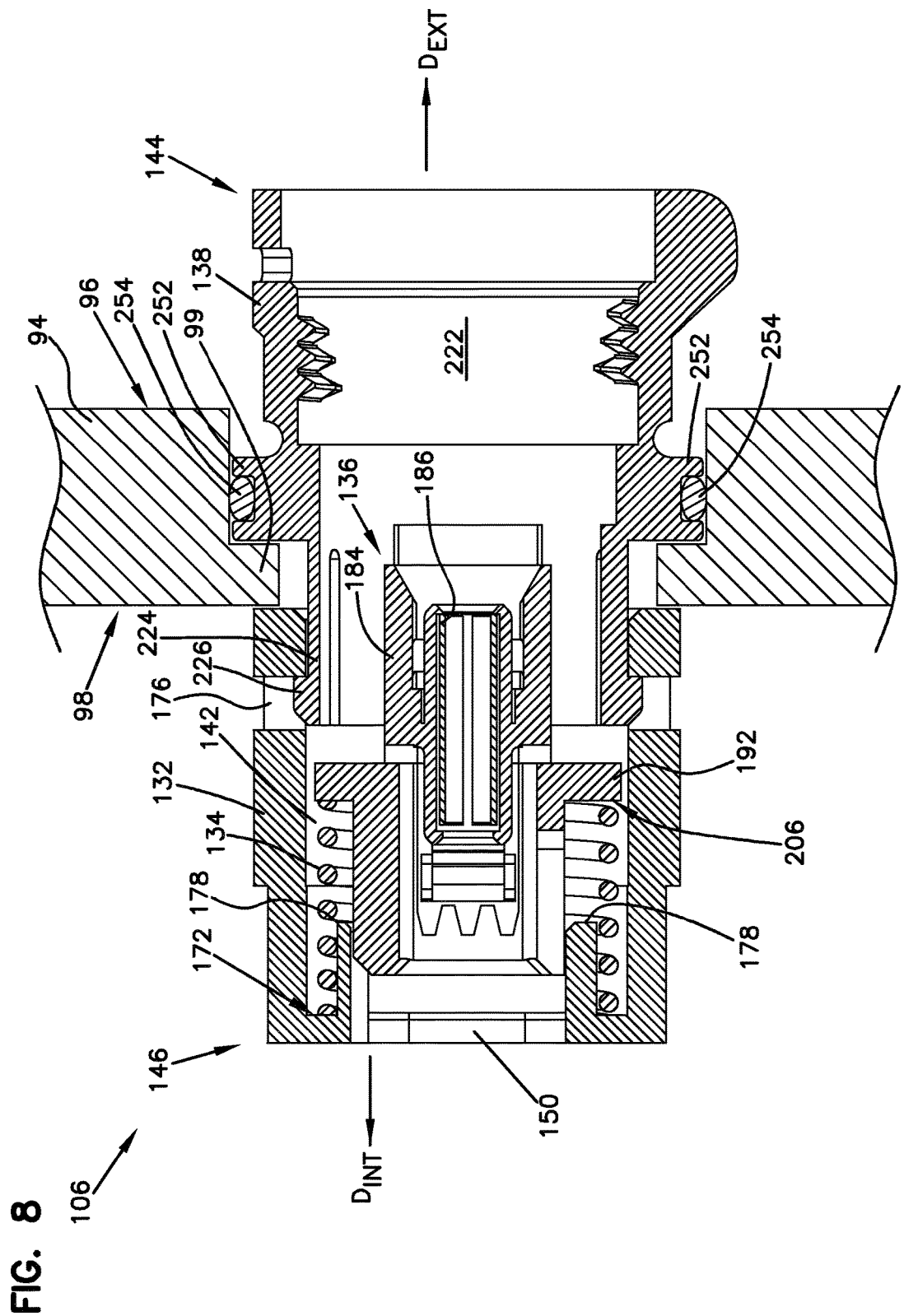
FIG. 8 is a cross-sectional view of the adapter assembly of FIG. 1, taken along line 8-8.
Figure 9:
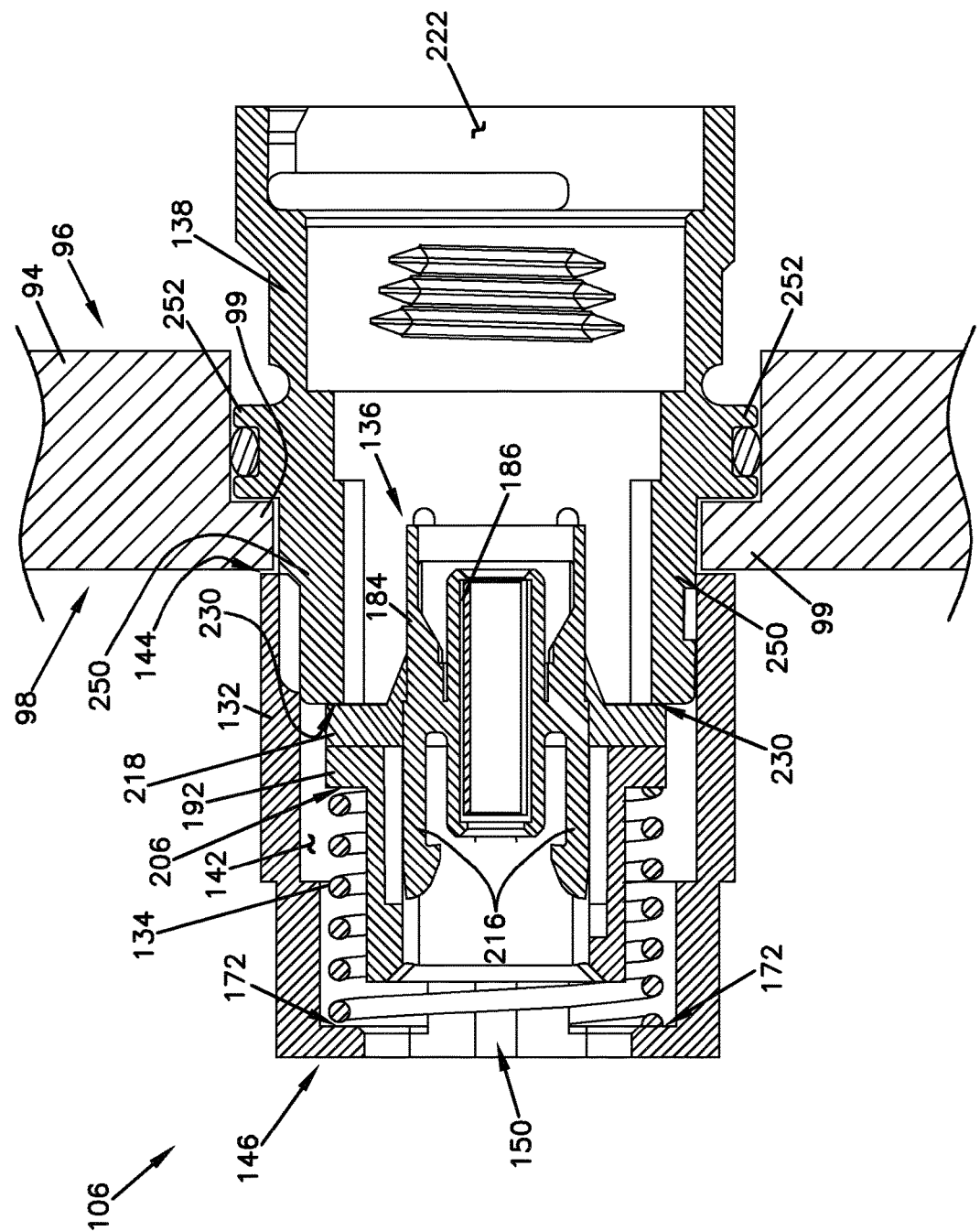
FIG. 9 is a cross-sectional view of the adapter assembly of FIG. 1, taken along line 9-9.

The adapter housing 139 includes the first housing component 132 and the second housing component 138. As illustrated in FIGS. 8 and 9, the second housing component 138 can be configured to be positioned on a first side (i.e. exterior side) 96 of a bulkhead 94 (e.g., on the outside of a bulkhead defined by a telecommunications closure or an enclosure), and the first housing component 132 can be configured to be positioned on an opposite second side (i.e., interior side) 98 of the bulkhead 94 (e.g., on the inside of the bulkhead within the telecommunications closure or the enclosure). The second housing component 138 can define an exterior, ruggedized port (e.g., an internal passageway 162 as shown in FIG. 2) for receiving the connector 102, and the first housing component 132 can define an interior, non-ruggedized port (e.g., an opening 150 as shown in FIGS. 3 and 4) for receiving the connector 104. In some embodiments, the first housing component 132 can be referred to as a retainer or retention member.

The first and second housing components 132 and 138 can cooperate to provide securement of the adapter housing 139 to the bulkhead 94. For example, the first and second housing components 132 and 138 can interlock such that a portion of the bulkhead is captured between the first and second housing components. The first and second housing components 132 and 138 can interlock in different manners. For example, the first and second housing components 132 and 138 can be mated together for interlocking. In other embodiments, the first and second housing components 132 and 138 can be threadedly engaged together. In yet other embodiments, the first and second housing components 132 and 138 can be snapped together when axially pressed toward each other.

In some embodiments, the second housing component 138 includes a neck portion 250 and a sealing flange portion 252. The neck portion 250 can include the plurality of retaining clips 224, which is configured to removably engage the first housing component 132, as described herein. The sealing flange portion 252 is configured to hold a sealing member 254, such as an O-ring, thereby providing a radial sealing of the adapter assembly 106 against the bulkhead 94. For example, the neck portion 250 is configured to be inserted into an opening of the bulkhead 94 from the exterior side 96 such that the flange portion 252 sits on a bulkhead shoulder 99. The sealing member 254 engaged by the sealing flange portion 252 can provide sealing between the adapter housing 139 and the inner surface of the opening of the bulkhead 94. The sealing member 254 is radially, circumferentially abutted with the inner surface of the opening of the bulkhead 94 to provide sealing therebetween. Then, the first housing component 132 is coupled to the second housing component 138 from the interior side 98. An axial end face (e.g., a first exterior end 144) of the first housing component 132 can be abutted to the interior side 98 of the bulkhead 94 when the first and second housing components 132 and 138 are coupled with the bulkhead 94 positioned therebetween. In addition or alternatively, an axial end face of the second housing component) 138 can be abutted to the bulkhead shoulder 99 when the first and second housing components 132 and 138 are coupled. The configurations of the adapter assembly 106 as described above can provide easy and fast installation of the adapter housing 139, compared to existing adapter assemblies with axial sealing members that requires additional steps to axially engage an independent sealing member over the adapter housing during installation.

The first housing component 132 is configured to receive biasing member 134 and the adapter module 136. The first housing component 132 defines an internal cavity 142 that is open through opposed ends, which are a first exterior end 144 and a first interior end 146. An opening 148 (FIGS. 3 and 4) through the first exterior end 144 is configured to receive the biasing member 134 and the adapter module 136, which are configured to be inserted into and retained within the internal cavity 142. An opening 150 (FIGS. 3 and 4) through the first interior end 146 is configured to receive the second fiber optic connector 104. An example of the first housing component 132 is illustrated and described in more detail with reference to FIGS. 3 and 4.

The biasing member 134 is configured to be disposed within the first housing component 132 and bias the adapter module 136 in the direction toward the first adapter end 122 of the adapter assembly 106 (i.e., a second exterior end 164 of the second housing component 138) so that the adapter module 136 is spring-loaded and disposed in the first housing component 132 in a floating manner. In some embodiments, the biasing member 134 is a single compression coil spring, as depicted in FIG. 2. An example configuration and operation of the biasing member 134 is illustrated and described herein.

The adapter module 136 defines a lengthwise, longitudinally extending passageway that is open through opposed ends, such as a first module end 154 and a second module end 156. The adapter module 136 is configured to receive and align, from the first module end 154, the ferrule assembly 114 of the first fiber optic connector 102 that is received from the first adapter end 122. The adapter module 136 is also configured to receive and align, from the second module end 156, the ferrule assembly of the second fiber optic connector 104 that is received from the second adapter end 124. The adapter module 136 can abut the distal end faces of the optical fibers of the first and second fiber optic cables 90 and 92. As such, the ferrule assembly 114 of the first fiber optic connector 102 is inserted through the port 222 (FIGS. 7-9) at the first adapter end 122 into the opening defined by the first module end 154 of the adapter module 136, while the ferrule assembly of the second fiber optic connector 104 is inserted through the opening 150 (FIGS. 3, 4, 8 and 9) at the second adapter end 124 into the opening defined by the second module end 156 of the adapter module 136. An example of the adapter module 136 is illustrated and described in more detail with reference to FIGS. 5 and 6.

The second housing component 138 is configured to be secured to the first housing component 132 adjacent the first exterior end 144 of the first housing component 132. When the second housing component 138 is mounted to the first housing component 132, the second housing component 138 secures the adapter module 136 within the first housing component 132 in such a manner that the adapter module 136 is floatingly disposed within the first housing component 132. Being floatingly disposed, the adapter module 136 is not fixed in the internal cavity 142 of the first housing component 132 and biased by the biasing member 134 toward the first adapter end 122 of the adapter assembly 106.

Figure 7:
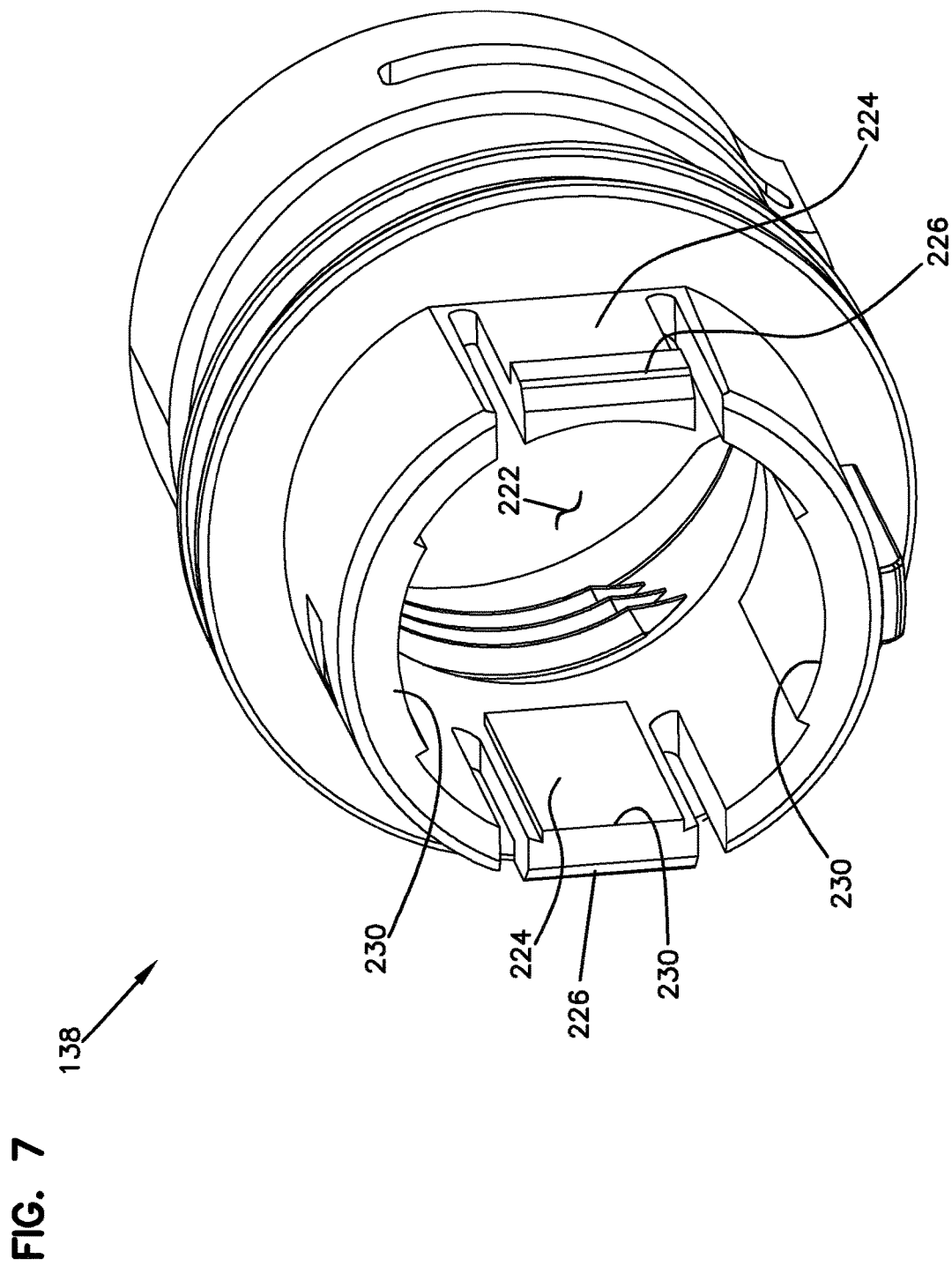
FIG. 7 is a perspective view of an example second housing component.

The second housing component 138 defines an internal passageway 162 that is open through opposed ends, which are a second exterior end 164 and a second interior end 166. The internal passageway 162 can define a port 222, as illustrated in FIGS. 7-9. In some embodiments, the second housing component 138 can include the second coupling mechanism 120 configured to be selectively coupled to the first coupling mechanism 118 of the first fiber optic connector 102. The first and second coupling mechanisms 118 and 120 are illustrated in U.S. Application No. 62/016,075, the disclosure of which is hereby incorporated by reference.

The second housing component 138 can include a housing coupling mechanism at the second interior end 166 such that a portion of the second housing component 138 at the second interior end 166 is secured to the first housing component 132 at the first exterior end 144. The second housing component 138 can be secured to the first housing component 132 in any suitable manner. In the depicted embodiment, the second housing component 138 includes a plurality of retaining clips 224 that engage corresponding slots 176 provided in the first housing component 132. An example of the second housing component 138 is illustrated and described in more detail with reference to FIG. 7.

As such, the first housing component 132 and the second housing component 138 define the housing 139 of the biasing member 134 and the adapter module 136. In the depicted embodiment, the first housing component 132 and the second housing component 138 are configured as separate elements. In other embodiments, however, the first housing component 132 and the second housing component 138 may be configured as a unit to define the housing.

FIGS. 3 and 4 illustrate an example first housing component 132. In particular, FIG. 3 is a perspective view of an example first housing component 132, and FIG. 4 is an opposite perspective view of the first housing component 132 of FIG. 3.

In some embodiments, the first housing component 132 is cylindrically shaped to define the internal cavity 142 between the first interior end 146 and the first exterior end 144. The internal cavity 142 is open through a first housing opening 148 at the first exterior end 144 and through a second housing opening 150 at the first interior end 146.

The first housing opening 148 is configured to receive the biasing member 134 and the adapter module 136 in order. The biasing member 134 inserted into the internal cavity 142 through the first housing opening 148 sits upon a shoulder 172 formed at the first interior end 146. The shoulder 172 is defined around the second housing opening 150 at the first interior end 146. In some embodiments where the biasing member 134 is a single compression coil spring, the spring is engaged with the shoulder 172 around the second housing opening 150 so that the spring is supported toward the first exterior end 144 against the first interior end 146 (FIGS. 8 and 9).

In some embodiments, the second housing opening 150 at the first interior end 146 can be fitted with a dust cap when not in use to reduce the possibility of accumulating contaminants within the internal cavity 142.

The second housing opening 150 is configured to slidably engage the adapter module 136 therethrough. In some embodiments, the second housing opening 150 can be dimensioned to correspond to the adapter module 136 (i.e., an adapter body 182 of the adapter module 136 (FIGS. 5 and 6)) such that the adapter module 136 slides along the second housing opening 150 as the adapter module 136 resists the biasing member 134.

The first housing component 132 includes a first guide element 174 configured to slidably engage a corresponding second guide element 208 (FIGS. 5 and 6) of the adapter module 136 to guide the adapter module 136 therealong such that the adapter module 136 longitudinally move through the second housing opening 150. In the depicted embodiment, the first guide element 174 is a groove defined adjacent the second housing opening 150 at the first interior end 146, while the second guide element 208 of the adapter module 136 is a projection longitudinally formed on the adapter module (FIGS. 5 and 6). The groove of the first guide element 174 is keyed to the projection of the second guide element 208. In other embodiments, the first guide element 174 can be a projection or protrusion while the second guide element 208 is a corresponding groove or slot. In yet other embodiments, the first and second guide elements 174 and 208 can be of different types.

In some embodiments, the first housing component 132 can include an axial stopper 178 configured to limit an axial movement of the adapter module 136 within the first housing component 132 (e.g., the internal cavity 142 of the first housing component 132) in the direction toward the first interior end 146 of the first housing component 132 (or the second adapter end 124 of the adapter assembly 106). In some embodiments, the axial stopper 178 includes one or more projections extending from the first interior end 146 in the direction to the first exterior end 144 within the first housing component 132.

FIGS. 5 and 6 illustrate an example adapter module 136. In particular, FIG. 5 is a perspective view of an example adapter module 136, and FIG. 6 is an opposite perspective view of the adapter module 136 of FIG. 5.

The adapter module 136 is mounted within the first housing component 132 with the second module end 156 facing toward the first interior end 146 of the first housing component 132 and the first module end 154 facing toward the first exterior end 144 of the first housing component 132. The adapter module 136 is configured to float within the first housing component 132 (and the second housing component 138). The biasing member 134 is configured to bias the adapter module 136 toward the first adapter end 122 (i.e., the second exterior end 164 of the second housing component 138) and allow the adapter module 136 to move axially along the longitudinal axis during insertion of the first fiber optic connector 102 into the adapter assembly 106 from the first adapter end 122. The biasing member 134 is captured between the inner shoulder 172 of the first housing component 132 and a flange 192 of the adapter module 136.

In some embodiments, the adapter module 136 can include an adapter body 182, a ferrule holder 184, and a ferrule alignment sleeve 186.

The adapter body 182 is configured to at least partially receive the ferrule holder 184. The adapter body 182 includes an enclosing side wall 188 defining an internal bore 190 therein. The internal bore 190 receives at least a portion of the ferrule holder 184 such that the side wall 188 surrounds the inserted portion of the ferrule holder 184. The enclosing side wall 188 can function to protect the ferrule holder 184 and the ferrules of the first and second fiber optic connectors 102 and 104 inserted into the ferrule holder 184. In some embodiments, the enclosing side wall 188 is configured as a plurality of side surfaces or as a cylindrical surface.

The adapter body 182 includes a flange 192 extending radially outwardly from the adapter body 182. The flange 192 is configured to support a first end 202 of the biasing member 134. For example, the flange 192 provides a supporting surface 206 that faces toward the second module end 156 (i.e., the second adapter end 124 of the adapter assembly 106) and is configured to engage the first end 202 of the biasing member 134.

In some embodiments, the adapter body 182 can include a second guide element 208 corresponding to the first guide element 174 of the first housing component 132. As described above, the second guide element 208 is configured to be slidably engaged with the first guide element 174 of the first housing component 132 such that the adapter body 182 slides along the first guide element 174 of the first housing component 132. In the depicted embodiment, the second guide element 208 is a projection longitudinally formed on the side wall 188 of the adapter body 182 to correspond to the groove of the first guide element 174 of the first housing component 132.

The ferrule holder 184 defines a barrel portion 212 longitudinally extending and configured to receive the ferrules of the first and second fiber optic connectors 102 and 104 from opposite directions. The barrel portion 212 operates to align the ends of the optical fibers of the first and second cables 90 and 92 therewithin. The barrel portion 212 can be cylindrically configured and have a central axis that aligns with the longitudinal axis of the adapter assembly 106.

The ferrule holder 184 is configured to be at least partially inserted into the internal bore 190 of the adapter body 182. In some embodiments, the ferrule holder 184 can include a holder flange portion 218 that is abutted with a surface of the flange 192 opposite to the supporting surface 206. When the ferrule holder 184 is engaged with the flange 192, an exposed portion 214 of the barrel portion 212 is received into the internal bore 190 of the adapter body 182 and surrounded by the enclosing side wall 188 of the adapter body 182. Thus, the portion 214 of the barrel portion 212 that is exposed at an end of the ferrule holder 184 can be protected by the enclosing side wall 188 of the adapter body 182 when assembled.

The ferrule holder 184 can include a pair of latching arms 216 configured to interlock with the second fiber optic connector 104 when the second fiber optic connector 104 is received through the second housing opening 150 of the first housing component 132. The pair of latching arms 216 is resiliently adapted for retaining the second fiber optic connector 104 within the internal bore 190 of the adapter body 182.

In some embodiments, the adapter module 136 can further include the ferrule alignment sleeve 186 that is mounted within the barrel portion 212 of the ferrule holder 184. The ferrule alignment sleeve 186 can be free to float slightly within the barrel portion 212, and have limited movement within the barrel portion 212. When the first fiber optic connector 102 is inserted from the first module end 154, the ferrule of the first fiber optic connector 102 is inserted within one end of the ferrule alignment sleeve 186. Similarly, when the second fiber optic connector 104 is inserted from the second module end 156, the ferrule of the second fiber optic connector 104 is inserted within the other end of the ferrule alignment sleeve 186. Accordingly, the ferrule alignment sleeve 186 can align the ferrules of the first and second fiber optic connectors 102 and 104 such that the corresponding fibers within the ferrules are coaxially aligned along the longitudinal axis (or the central axis of the ferrule holder 184). The ferrule alignment sleeve 186 can be a split-sleeve with a slit 187 and made of a resilient material, such as metal, that flexes to accommodate the ferrules of the first and second optic connectors 102 and 104.

FIG. 7 is a perspective view of an example second housing component 138. Referring to FIGS. 2 and 7, the second housing component 138 fits within the first housing component 132 at the first exterior end 144 and forms the first adapter end 122 of the adapter assembly 106. The second housing component 138 defines a port 222 configured to receive the first fiber optic connector 102. In some embodiments, the port 222 can be fitted with a dust cap when not in use to reduce the possibility of accumulating contaminants within the adapter assembly 106.

In some embodiments, the second housing component 138 can include a plurality of retaining clips 224 having tabs 226. The plurality of retaining clips 224 is resiliently configured to snap-fit within the corresponding slots 176 of the first housing component 132. For example, when the second housing component 138 is inserted into the first exterior end 144 of the first housing component 132, the flexible clips 224 flex inwardly until the tabs 226 reach the slots 176 defined by the first housing component 132. When the tabs 226 reach the slots 176, the clips 224 flex outwardly causing the tabs 226 to snap within the corresponding slots 176 thereby securing the second housing component 138 within the first housing component 132.

The second housing component 138 can further include an axial stopper 230 configured to limit an axial movement of the adapter module 136 within the first housing component 132 in a direction toward the first adapter end 122 of the adapter assembly 106 (i.e., the second exterior end 164 of the second housing component 138). In some embodiments, the axial stopper 230 includes one or more raised portions that are formed from an inner surface of the second housing component 138 and configured to engage the holder flange portion 218 of the adapter module 136 to retain the adapter module 136 within the first housing component 132.

FIGS. 8 and 9 are cross-sectional views of the adapter assembly 106 of FIG. 2. As depicted, the adapter module 136 is captured between the first and second housing components 132 and 138 and biased toward the exterior port 222 by the single biasing member 134. The adapter module 136 can move and floats as a unit within the adapter housing 139, which includes the first and second housing components 132 and 138. In some embodiments, the single biasing member 134 is a compression coil spring designed to resist being compressed.

As described, the flange 192 of the adapter module 136 forms an annular spring sit (e.g., the supporting surface 206) against which an end of the biasing member 134 exerts a spring force in the exterior axial direction $D_{EXT}$. The inner shoulder 172 of the first housing component 132 provides an annular surface against which the other end of the biasing member 134 sits and exerts a repelling force.

The single biasing member 134 is disposed in the internal cavity 142 of the first housing component 132. In some embodiments, the single biasing member 134 is engaged between the inner shoulder 172 of the first housing component 132 and the supporting surface 206 of the flange 192 of the adapter module 136. The first end 202 of the biasing member 134 is supported by the supporting surface 206 of the flange 192, and the second end 204 of the biasing member 134 is supported by the inner shoulder 172 of the first housing component 132. The single biasing member 134 is configured to bias the adapter module 136 against the first interior end 146 of the first housing component 132 in the direction toward the first exterior end 144 of the first housing component 132. The single biasing member 134 can compress to allow the adapter module to move in the direction toward the first interior end 146 (i.e., the second adapter end 124 of the adapter assembly 106) within the first housing component 132 when, for example, the first fiber optic connector 102 is inserted into the port 222 of the second housing component 138 from the first adapter end 122 of the adapter assembly 106.

The single biasing member 134 is concentrically aligned with the adapter module 136 in the internal cavity 142 of the first housing component 132. The single biasing member 134, which is coaxially arranged with the adapter module 136 as described herein, is more advantageous than a plurality of springs used in conventional adapter assemblies for several reasons. For example, the single biasing member 134 can absorb tolerances during assembling of the adapter assembly 106. Where the adapter assembly includes a plurality of springs, it is not easy to accurately arrange all of the springs together between the first housing component and the adapter module during assembly, and such improper alignment of the plurality of springs can cause uneven biasing of the adapter module. The single biasing member can eliminate the difficulty in aligning the biasing member in the adapter assembly and provide even biasing of the adapter module. Further, the adapter assembly in accordance with the present teachings can eliminate a plurality of structures for supporting the plurality of springs and minimize an area for supporting the single biasing member, thereby decreasing the adapter assembly in size and improve the alignment and protection of the ferrules of the fiber optic cables.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

LIST OF REFERENCE NUMERALS AND CORRESPONDING FEATURES 90 cable
92 fiber optic cable
94 bulkhead
96 first side
98 second side
99 bulkhead shoulder
100 fiber optic connection system
102 fiber optic connector
104 second fiber optic connector
106 adapter assembly
112 connector housing
114 ferrule assembly
116 coupling nut
118 first coupling mechanism
120 second coupling mechanism
122 first adapter end
124 second adapter end
132 first housing component
134 biasing member
136 adapter module
138 second housing component
139 housing
142 internal cavity
144 first exterior end
146 first interior end
148 first housing opening
150 opening
154 first module end
156 second module end
162 internal passageway
164 second exterior end
166 second interior end
172 inner shoulder
174 first guide element
176 slots
178 axial stopper
182 adapter body
184 ferrule holder
186 ferrule alignment sleeve
188 enclosing side wall
190 internal bore
192 flange
202 first end
204 second end
206 supporting surface
208 second guide element
212 barrel portion
214 exposed portion
216 latching arms
218 holder flange portion
222 port
224 retaining clips
226 tabs
230 axial stopper
250 neck portion
252 sealing flange portion
254 sealing member

What is claimed is:

1. A fiber optic adapter assembly comprising:
a housing defining an internal cavity being open through a first opening at a first exterior end and through a second opening at a first interior end opposite to the first exterior end, the housing including a first guide element;
an adapter module floatingly disposed in the internal cavity of the housing and configured to align ferrules of a first fiber optic connector and a second fiber optic connector inserted into the adapter module in opposite directions, the adapter module including:
a ferrule holder having a barrel portion extending along a longitudinal axis and configured to receive the ferrules of the first fiber optic connector and the second fiber optic connector from opposite directions and configured to align optical fibers of the first fiber optic connector and the second fiber optic connectors therein, and
an adapter body surrounding the ferrule holder and including a flange extending radially outwardly from the adapter body and a second guide element correspondingly engaging the first guide element of the housing, and the adapter body being longitudinally slidable through the second opening of the housing; and
a single biasing member disposed in the internal cavity of the housing surrounding the adapter body and engaging the flange, and concentrically aligned with the adapter module, the single biasing member surrounding the second guide element and being configured to bias the adapter module in a direction toward the first exterior end and be compressible in a direction toward the first interior end.

2. The adapter assembly according to claim 1, wherein the single biasing member is a compression coil spring.

3. The adapter assembly according to claim 1, wherein:
the first guide element is a groove defined adjacent the second opening of the housing at the first interior end; and
the second guide element is a projection formed along the longitudinal axis on the adapter module.

4. The adapter assembly according to claim 1, wherein the ferrule holder includes a pair of latching arms configured to interlock with the second fiber optic connector when the second fiber optic connector is received through the second opening of the housing.

5. The adapter assembly according to claim 1, wherein the adapter module further comprises:
a ferrule alignment sleeve disposed within the barrel portion of the ferrule holder and configured to receive the ferrules of the first and second fiber optic connectors from opposite directions.

6. The adapter assembly according to claim 1, wherein the housing comprises:
a first housing component configured to at least partially receive the biasing member and the adapter module, the first housing component including a plurality of retaining slots;
a second housing component secured to the first housing component and including a plurality of corresponding retaining clips configured to engage the plurality of retaining slots of the first housing component.

7. The adapter assembly according to claim 6, wherein the second housing component includes an axial stopper configured to limit an axial movement of the adapter module within the first housing component in a direction toward the first exterior end of the first housing component.

8. The adapter assembly according to claim 1, wherein the housing includes an axial stopper configured to limit an axial movement of the adapter module within the housing in the direction toward the first exterior end of the housing.

9. The adapter assembly according to claim 8, wherein the axial stopper includes one or more projections extending from the first interior end in the direction to the first exterior end within the housing.

10. A fiber optic adapter assembly comprising:
a first housing component defining a first housing opening, an internal cavity, and a second housing opening, the internal cavity being open at a first exterior end through the first housing opening and at a first interior end through the second housing opening, the first exterior end opposite to the first interior end along a longitudinal axis, wherein the first housing component includes a plurality of retaining slots and a first guide element;
an adapter module floatingly disposed in the internal cavity of the first housing component and defining a ferrule alignment passageway opening through a first module end and a second module end opposite to the first module end along the longitudinal axis, the adapter module including:
a ferrule holder having a barrel portion extending along the longitudinal axis and configured to receive ferrules of a first fiber optic connector and a second fiber optic connector from opposite directions and configured to align optical fibers of the first fiber optic connector and the second fiber optic connectors therein, and
an adapter body surrounding the ferrule holder and including a flange extending radially outwardly from the adapter body and a second guide element correspondingly engaging the first guide element of the first housing component, and the adapter body being longitudinally slidable through the second housing opening;
a single biasing member disposed in the internal cavity of the first housing component surrounding the adapter body and engaging the flange, and concentrically aligned with the adapter module, the single biasing member surrounding the second guide element and being configured to bias the adapter module in a direction toward the first exterior end and be compressible in a direction toward the first interior end; and
a second housing component secured to the first housing component and including a plurality of corresponding retaining clips configured to engage the plurality of retaining slots of the first housing component.

11. The adapter assembly according to claim 10, wherein the adapter body is configured to move through the second housing opening of the first housing component along the longitudinal axis.

12. The adapter assembly according to claim 10, wherein:
the first housing component includes a shoulder formed at the first interior end and configured to support a first end of the single biasing member;
the adapter body including an enclosing side wall configured to at least partially surround the ferrule holder; and
the flange being configured to engage a second end of the single biasing member.

13. The adapter assembly according to claim 10, wherein:
the first guide element is a groove defined adjacent the second housing opening at the first interior end; and
the second guide element is a projection formed along the longitudinal axis on the adapter module.

14. The adapter assembly according to claim 13, wherein the first and second guide elements are separate elements from the flange of the adapter body, and wherein the first and second guide elements extend longitudinally and outwardly from the flange.

15. The adapter assembly according to claim 10, wherein the flange surrounds the adapter body and engages an end of the single biasing member.

* * * * *